United States Patent [19]

Campbell

[11] Patent Number: 5,509,671
[45] Date of Patent: Apr. 23, 1996

[54] CART FOR CARRYING SPOOLS OF WIRE

[76] Inventor: William F. Campbell, 4003 Charles St., Rockford, Ill. 61108-6135

[21] Appl. No.: 410,103

[22] Filed: Mar. 24, 1995

[51] Int. Cl.⁶ .............................. B65H 75/40; B62B 1/12
[52] U.S. Cl. ...................... 280/47.19; 280/47.24; 242/557; 242/594.6; 242/588.1
[58] Field of Search ................. 280/47.18, 47.19, 280/47.28, 47.131, 47.24, 652, 47.35; 242/557, 566, 594.3, 594.4, 594.5, 594.6, 588, 588.1; 414/446, 608

[56] References Cited

U.S. PATENT DOCUMENTS

| | | | |
|---|---|---|---|
| 2,155,769 | 4/1939 | Porter | 242/557 |
| 2,705,114 | 3/1955 | Worsham | 280/47.24 |
| 3,313,498 | 4/1967 | Wasson | 242/588 |
| 3,870,177 | 3/1975 | Cobb | 414/446 |
| 4,391,422 | 7/1983 | McDonald | 242/557 |
| 4,457,527 | 7/1984 | Lowery | 280/47.19 |
| 4,530,472 | 7/1985 | Voss et al. | 242/588.1 |
| 4,564,152 | 1/1986 | Herriage | 280/47.19 |
| 4,585,130 | 4/1986 | Brennan | 211/190 |
| 4,611,645 | 9/1986 | Whisnant | 280/47.19 |
| 5,123,666 | 6/1992 | Moore | 280/47.18 |
| 5,308,012 | 5/1994 | Fuller | 280/47.19 |
| 5,362,078 | 11/1994 | Paton | 280/47.18 |
| 5,390,943 | 2/1995 | Hedrick | 280/47 |

FOREIGN PATENT DOCUMENTS 1114180  5/1968  United Kingdom ........... 242/557

*Primary Examiner*—Karin L. Tyson
*Attorney, Agent, or Firm*—Leydig, Voit & Mayer, Ltd.

[57] ABSTRACT

A cart is adapted to carry spools of electrical wire to enable a variety of different types and gauges of wire to be transported from place-to-place. The cart includes racks for holding the spools, each rack being sized to typically hold three or four spools. The racks are releasably secured to and selectively removable from the cart to enable the spools on the racks to be carried to a site which is remote from the cart.

6 Claims, 3 Drawing Sheets

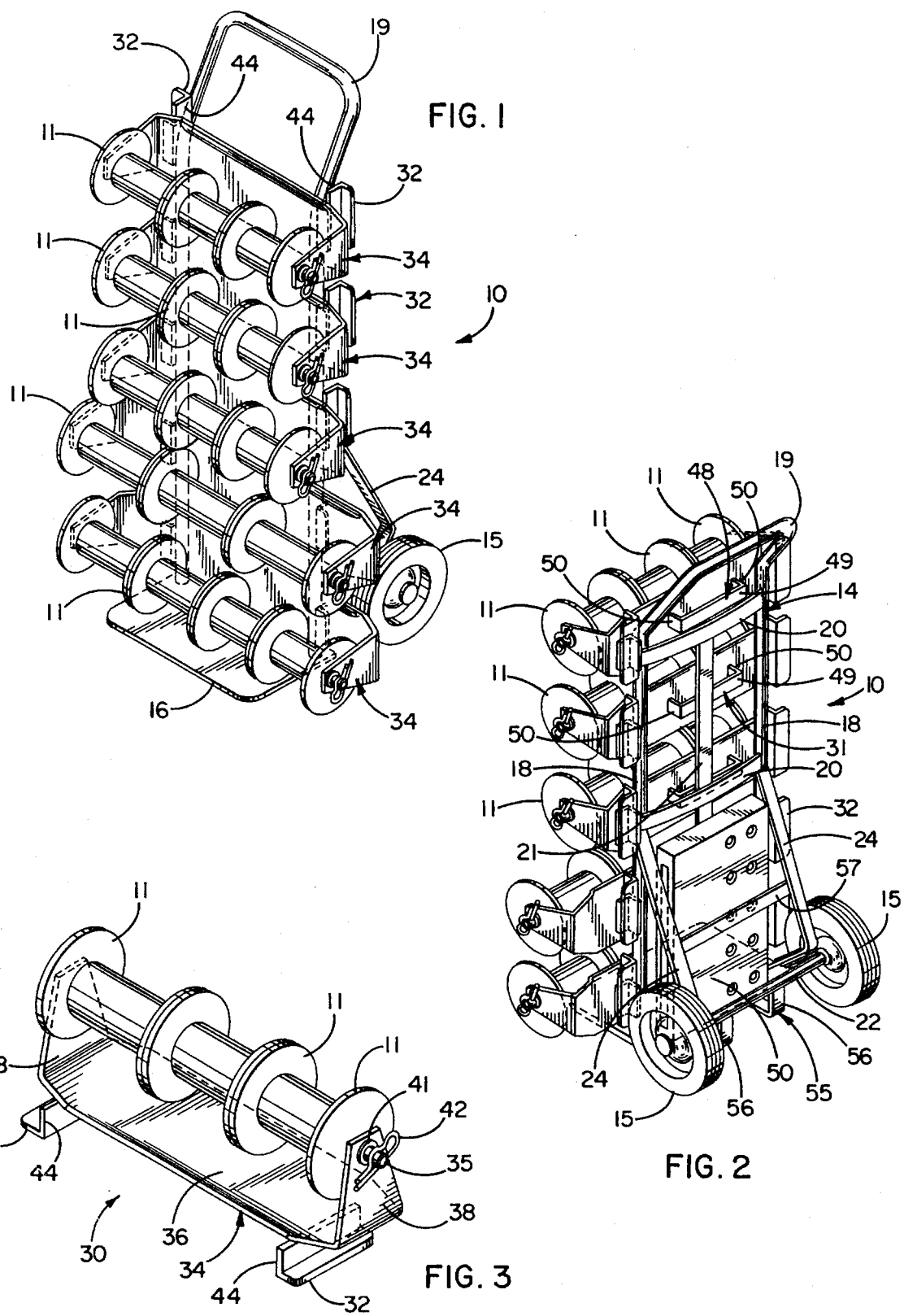

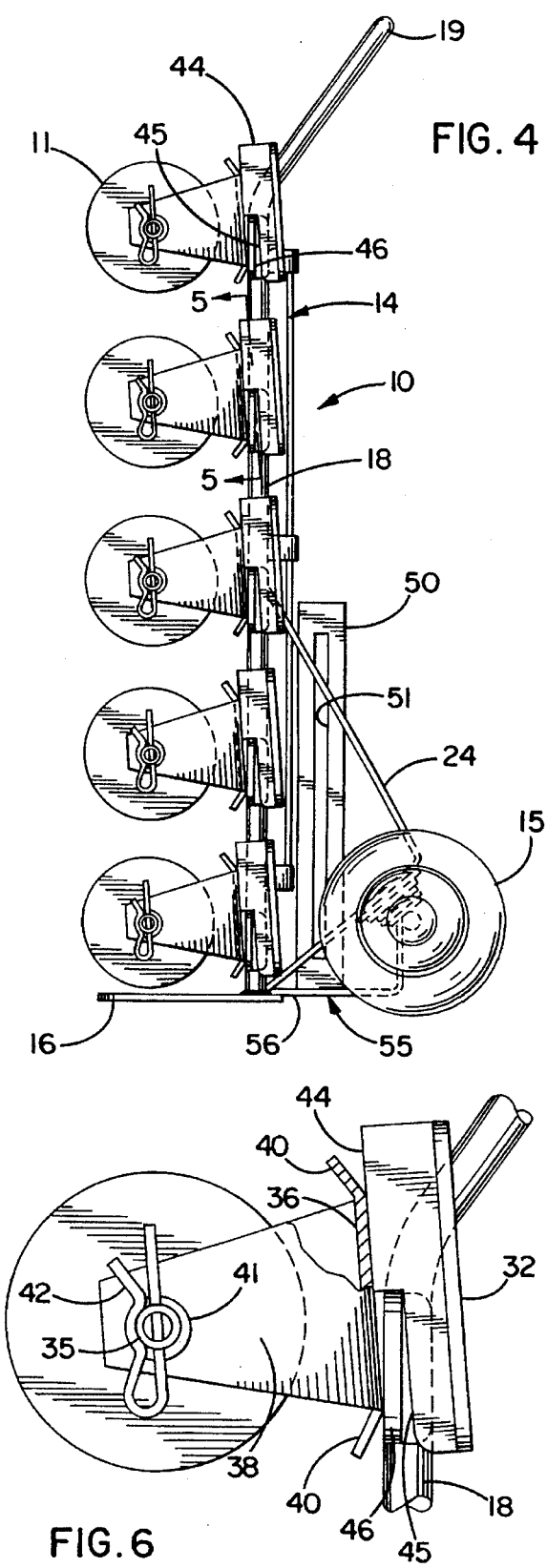
FIG. 4
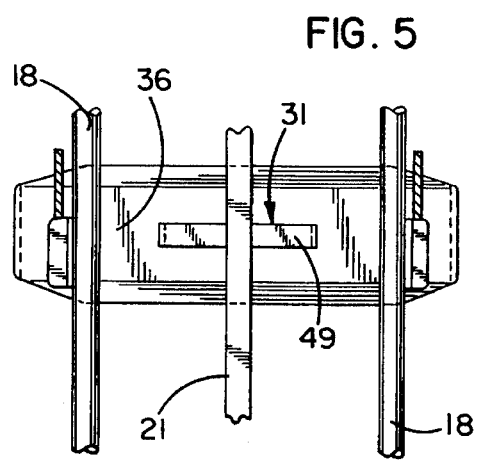
FIG. 5
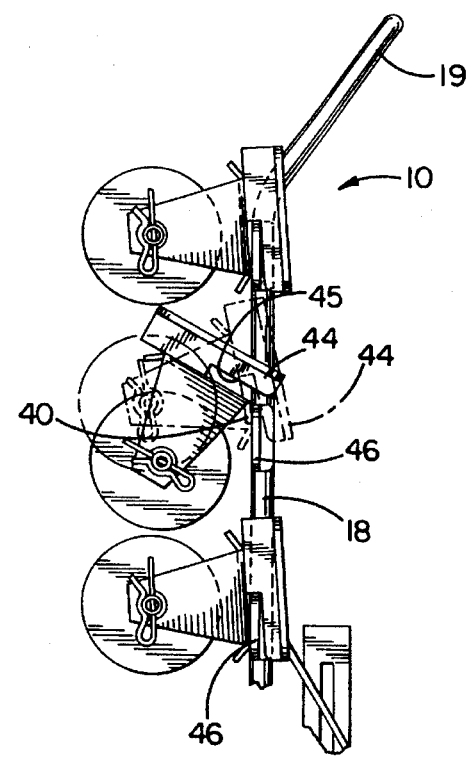
FIG. 6
FIG. 7

CART FOR CARRYING SPOOLS OF WIRE

BACKGROUND OF THE INVENTION

This invention relates generally to a device adapted to hold multiple spools of wound material for selective dispensing or unwinding of the material from the spools.

More particularly, the invention relates to a portable cart adapted to carry multiple spools of electrical wire. Carts of this type are useful, for example, by electricians who wire industrial, commercial or residential buildings. In such a building, electrical wire of different gauges, types, and color coding is utilized. To maintain existing electrical systems or to install new electrical systems in such a building, various types of wire must be available. Securing spools of wire to a cart enables the wire to be transported to different job sites in the building and frequently avoids the need to make trips to a central storage location to get the necessary wire. Several prior carts adapted to carry spools of wire are well suited to transport a variety of wire.

Not all such job sites, however, are accessible to a cart. For example, some wiring in industrial buildings is only accessible by way of a raised walkway or permanent scaffolding and the electrical wire must be hand-carried up the scaffolding. In this instance, either the wire must be pre-cut before ascending to the job site or the individual spools of wire must be removed from the cart and carried up the scaffolding. In the first case, the length of wire needed for a such a job must either be estimated or measured before being cut from the spools. This leaves open the possibility that the pre-cut lengths of wire will not be long enough and that additional trips to the cart will be necessary. In addition, the pre-cut wire must be hand-wound into manageable bundles before being carried to the job site. While carrying spools of wire to the job site may be preferable for simple jobs, jobs which require several types of wire may require more than one trip between the cart and the job site. Moreover, neither of these alternatives provides for a convenient method of dispensing the wire from the spools or for unwinding the hand-wound bundles at the job site.

SUMMARY OF THE INVENTION

The general aim of the present invention is to provide a new and improved cart adapted to carry spools of electrical wire and having means to facilitate transport of some of the spools to a location which is remote from the cart.

A detailed objective is to achieve the foregoing by providing a cart equipped with racks of spools, each rack being adapted to individually slip onto and off of support brackets on the cart and being equipped with a handle so as to enable transport of the spools.

Another objective of the invention is to provide for relatively easy dispensing or unwinding of the wire from the spools at the remote location.

A detailed objective is to achieve the foregoing by providing racks having feet for supporting the racks when the racks are removed from the cart and for positioning the spools so as to be freely rotatable.

The invention also resides in the provision of a unique wire guide which is transportable with the cart and which facilitates the simultaneous unwinding of multiple wires from different spools on the cart.

These and other objects and advantages of the invention will become more apparent from the following detailed description when taken in conjunction with the accompanying drawings.

BRIEF DESCRIPTION OF THE DRAWINGS

FIG. 1 is a perspective view of a new and improved cart carrying spools and incorporating the unique features of the present invention.

FIG. 2 is a perspective view of the back of the cart.

FIG. 3 is a perspective view of certain parts shown in FIG. 1.

FIG. 4 is a side view of the cart.

FIG. 5 is an enlarged fragmentary view taken substantially along the line 5—5 of FIG. 4.

FIG. 6 is an enlarged fragmentary view of certain parts shown in FIG. 4.

FIG. 7 is a fragmentary side view similar to FIG. 4 but showing certain parts as they are being removed from the cart, one position of the parts being shown in phantom lines.

Figure 8:
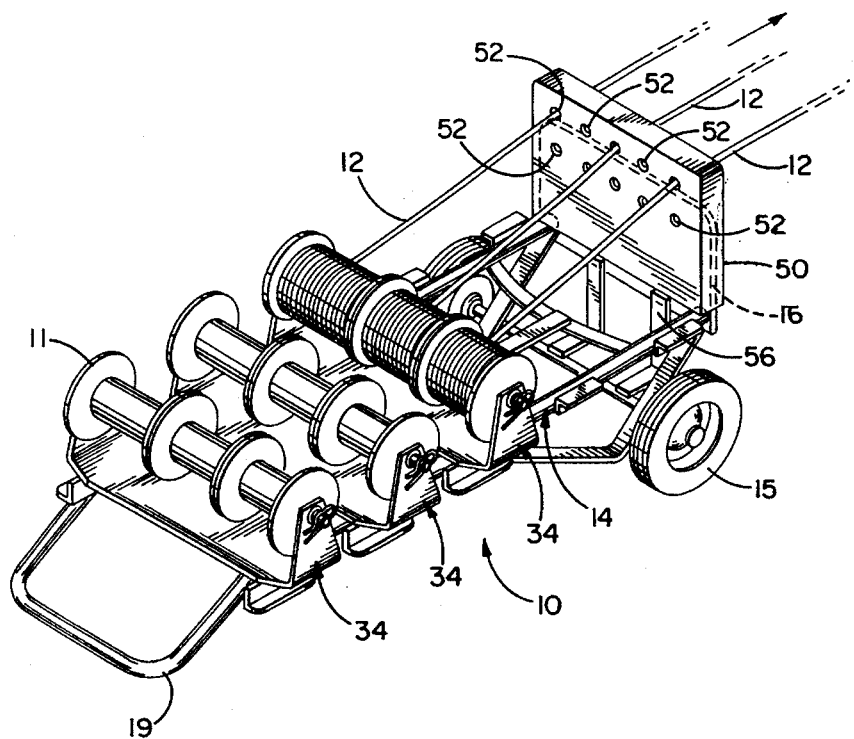
FIG. 8 is a perspective view of the cart in a horizontal position and showing multiple wires being drawn from different spools.

While the invention is susceptible of various modifications and alternative constructions, a certain illustrated embodiment hereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

For purposes of illustration, the present invention is shown in the drawings as embodied in a portable cart 10 (FIG. 1) adapted to carry spools 11 of electrical wire 12 (FIG. 8). As shown in FIG. 1, the cart is adapted to normally stand in a generally upright position. For purposes of explaining the invention, the cart will be assumed to be in this position, except where otherwise noted, and the spools will be considered to be located in front of the cart.

In general, the cart 10 includes an elongated and generally vertical frame 14 (FIG. 2), a pair of laterally spaced wheels 15 secured to a solid axle 22 for rotation relative to the frame, and a platform 16 which extends forwardly from the base of the frame. The axle is positioned rearwardly of the frame and near the base of the frame so that the wheels are normally resting on the ground. The platform also normally rests on the ground and coacts with the wheels to support the cart in the upright position. By pivoting the upper portion of the frame rearwardly and downwardly about the wheels, the platform may be raised from the ground and the cart may be moved from place-to-place.

The frame 14 is formed from relatively heavy gauge steel to support the weight of the wire 12. The frame includes vertically extending, elongated side rails 18 and an integrally formed handle 19 which extends generally rearwardly from and laterally between the side rails. The axle 22 is welded to axle support members 24 which, in turn, are welded to the backside of the side rails. Vertically spaced cross-support members 20 welded between the side rails and a vertically extending support member 21 welded to and connecting the cross-support members provide additional structural support for the frame.

In accordance with one aspect of the present invention, the spools 11 are carried on racks 30 which are releasably secured to and selectively removable from the frame 14.

Each rack is adapted to carry several spools and is equipped with a handle 31 (FIG. 5). As a result, the racks enable relatively easy transport of several spools of wire 12 to a site which is remote from the cart 10. In addition, each rack is equipped with integral feet 32 (FIG. 3) for supporting the rack at the remote site so as to facilitate unwinding of the wire from the spools.

In general, each rack 30 includes a main bracket 34 formed from relatively heavy gauge steel and a tube 35 which is releasably secured to the main bracket for carrying the spools. More specifically, the main bracket is formed with a back panel 36 which extends laterally across the frame 14 and two integrally formed side panels 38 located at each end of the back panel. The upper and lower laterally extending edge portions 40 (FIG. 6) of the back panel slope forwardly at a relatively small angle to enhance the stiffness of the back panel. The side panels extend forwardly from the back panel and are formed with openings (not shown) aligned with one another and sized to slidably receive the tube. To releasably secure the spools to the main bracket, the tube is slipped through openings formed in the center of the spools, the spools and the tube are raised to a position adjacent the side panels, and one end of the tube is slid through the opening in the adjacent side panel until the opposite end of the tube slips inside of the oppositely located side panel. The opposite end of the tube is then pushed through the opening located in the opposite side panel until both ends of the tube extend outwardly of the side panels. A wear washer 41 is slipped over each end of the tube and cotter pins 42 are installed into openings (not shown) formed through the ends of the tube so as to releasably secure the tube and the spools to the main bracket.

In carrying out the invention, the racks 30 are formed with downwardly opening slots 45 (FIG. 6) sized to slidably receive support brackets 46 which are secured to the frame 14. More specifically, the support brackets extend laterally and outwardly from the side rails 18 and are vertically positioned along the side rails to define vertically spaced pairs of horizontally aligned brackets, each pair being capable of supporting a rack of spools. The racks include support members 44 which extend rearwardly from the back side of the back panel 36 and which are laterally spaced on the back panel so as to be located outwardly of the side rails. In addition, the support members extend generally vertically along the back panel and are formed with upper and lower portions. The upper portions of the support members are welded to the back panel. The lower portions of the support members are formed with cut-outs adjacent the back panel so as to coact with the back panel to define the slots.

With the foregoing arrangement, each rack 30 may be installed onto the frame 14 by positioning the open ends of the slots 45 above and generally aligned with a pair of support brackets 46 and then lowering the rack until the closed ends of the slots rest on the support brackets. When the racks are on the frame, wire may be drawn off of any or all spools when the cart is either upright or lying horizontally.

In this case, the rack is removed from the frame by simply lifting the rack in a generally upwardly direction and off of the support brackets. As a result, the frame is adapted to releasably carry several vertically spaced racks, each rack being adapted to carry several spools 11 of wire 12.

As shown in FIG. 7, the racks 30 may be alternately adapted to be removable from the frame 14 before the lower portions of the support members 44 have completely cleared the support brackets 46 as the racks are lifted upwardly from the frame. To this end, the width of the slots 45 and the angle of the lower edge portions 40 of the back panels 36 are sized to allow the upper portion of the rack to be pivoted forwardly after the support members have been raised substantially but not completely above the support brackets (shown in phantom lines in FIG. 7). As the upper portion of the racks pivot forwardly, the lower portions of the support members pivot upwardly to clear the upper surface of the support brackets. The rack can then be pulled forwardly and away from the cart. A reverse procedure may be used to install the racks onto the support brackets. As a result, this arrangement allows the support brackets to be located relatively close to one another so as to maximize the number of racks that can be placed on a cart 10 of a given height.

In keeping with the invention, the handle 31 is secured to the main bracket 34 of each rack 30. The handle is formed with an elongated grip portion 49 (FIG. 2) and with two legs 50 located at the ends of the grip portion. The legs of the handle are welded to the back side of the back panel 36 such that the handle projects rearwardly from the back panel and does not protrude from the cart 10 when the rack is located on the frame 14. The handle is preferably located in the center of the back panel with the grip portion extending laterally along a substantial length of the back panel and being aligned with the axis of the tube 35. As a result, the rack is adapted to be carried with the spools 11 suspended below the handle and with the weight of the spools acting downwardly in a vertical plane which passes through the grip portion of the handle. Moreover, the handle can be gripped in a lateral position which is generally aligned with the center of gravity of the combined weight of the spools. Accordingly, the handles enable relatively easy transport of several racks with several spools of wire to a site which is remote from the cart.

In further carrying out the invention, the feet 32 are secured relative to the back panel 36 and are adapted to position the tube 35 in a horizontally extending position above the back panel. As a result, the spools 11 are free to be rotated on the tube when the rack 30 is resting on the ground. In the embodiment shown, the feet are defined by flat portions which are integrally formed with the support members 44. The feet extend perpendicular to the axis of the spools and parallel to the back panel. In addition, the feet are centered relative to the axis of the spools such that the feet are located below the center of gravity of the spools when the rack is resting on the ground. Accordingly, the feet provide a relatively stable base for unwinding wire from the spools at the remote site.

Further in accordance with the present invention, the cart 10 is equipped with a portable wire guide 50 (FIG. 8) which is adapted for use when the cart is in a generally horizontal position. The guide is adapted to individually guide wires 12 which are drawn from different spools 11 on the cart and to keep the wires separated from one another until after the wires have passed through the guide. As a result, the guide is especially useful when simultaneously drawing multiple wires from the cart and when assembling multi-wire bundles.

More specifically, the guide 50 is formed with a slot 51 (FIG. 4) sized to slidably receive the platform 16 when the platform is raised from the ground. To use the guide, the upper end of the cart 10 is pivoted rearwardly and downwardly about the wheels 15 until the handle 19 of the cart rests on the ground. With the cart in this substantially horizontal position, the platform extends generally upwardly and the guide can be slipped onto the platform.

The guide 50 is further formed with holes 52 sized to slidably receive the wires 12. The holes are formed in rows which are vertically spaced from one another and which are located above the spools 11 when the guide is positioned on the platform 16. As the wire is drawn through the holes, the guide causes the wire to slope upwardly and away from the spools in a direction which is generally perpendicular to the axis of rotation of the spools. As a result, the guide prevents the wires from becoming entangled with one another as they are unwound from the spools.

In keeping with the invention, the cart 10 includes a storage rack 55 for storing the wire guide 50 when it is not in use. The storage rack is located between the frame 14 and the axle 22 and is formed by welding angled floor members 56 between the base of the frame and the axle. Specifically, the floor members extend downwardly from the axle and then forwardly to the base of the frame. The guide rests on its side on the floor members. In this stowed position, the guide is laterally trapped between the axle support members 24. In addition, a cross support member 57 secured between the axle support members and above the axle prevents the guide from pivoting off of the floor members when the cart is tipped for moving from place-to-place. Accordingly, the guide does not hinder the mobility of the cart and may be transported with the spools 11 of wire 12 on the cart.

From the foregoing it will be apparent that the present invention brings to the art a new and improved cart 10 equipped with a portable wire guide 50 and further equipped with uniquely configured racks 30 for carrying spools 11 of wire 12, the racks being adapted to slip onto and off of the cart and being equipped with feet 32 and a handle 31. Accordingly, multiple spools of wire can to be easily transported to a site which is remote from the cart and the wire may be easily unwound from the spools at such a site.

I claim:

1. A portable cart for carrying spools, said cart comprising a substantially vertical frame having two vertically extending side rails laterally spaced from one another, a plurality of wheels mounted on said frame for rotation relative to said frame, said wheels resting on the ground such that the cart is mobile, a pair of horizontally aligned support brackets secured to and extending from said side rails, and a rack having a laterally extending panel and having means connected to said panel for releasably supporting a plurality of spools, said supporting means being adapted to permit rotation of the spools relative to said panel, said rack further having two laterally spaced support members connected to said panel, said support members being adapted to rest on said support brackets such that said rack is releasably secured to and is selectively removable from said frame, said support brackets coacting with said support members to support all of the weight of said rack and to permit removal of said rack from said frame by lifting said rack upwardly, said rack further having a handle secured to said panel so as to enable said rack and said spools to be carried to a location remote from the frame.

2. A portable cart as defined in claim 1 in which said rack further includes a plurality of feet secured relative to said panel for resting said rack on the ground when the rack is removed from said frame, said feet being located oppositely of said supporting means relative to said panel, said feet being adapted to support the spools above said panel when said feet are resting on the ground.

3. A portable cart for carrying spools, said cart comprising a substantially vertical frame having two vertically extending side rails laterally spaced from one another, a plurality of wheels mounted on said frame for rotation relative to said frame, said wheels resting on the ground such that the cart is mobile, a plurality of vertically spaced pairs of support brackets extending from said side rails, the support brackets of each pair being horizontally aligned with one another, a plurality of vertically spaced racks for holding the spools, each of said racks having a laterally extending back panel located forwardly of said frame and having two laterally spaced side panels extending forwardly from said back panel, each of said racks further having two support members extending rearwardly from said back panel, said support members having upper portions connected to said back panels and having lower portions spaced from said back panels so as to define downwardly opening slots formed with closed upper ends, said slots of each rack being sized and located so as to slidably receive a pair of said support brackets such that said upper portions of said support members rest on said support brackets and such that said racks are releasably secured to and are selectively removable from said frame, each of said racks further having a rod member extending laterally between said side panels and having means for releasably securing said rod member to said side panels, said rod members being adapted to slip through the center of the spools such that the spools are releasably carried by said rod members between said side panels, said rod members being adapted to permit rotation of the spools relative to said back panels, each of said racks further having a handle secured to and extending rearwardly from said back panel so as to enable each of said racks to be carried to a location remote from the frame.

4. A portable cart as defined in claim 3 in which each of said racks further includes a pair of feet for resting the rack on the ground when the rack is removed from said frame, said feet being secured to and being located rearwardly of said support members when said racks are located on said frame, said feet being adapted to support the back panel of the respective rack in a substantially horizontal position such that the spools are located above the back panel of the rack when said feet are resting on the ground.

5. A portable cart for carrying spools of wire, said cart comprising an elongated frame adapted to be moved between an upright position and a substantially horizontal position, said frame having upper and lower end portions when in said upright position, means for releasably securing the spools to said frame, said means being generally located above said frame when said frame is in said substantially horizontal position such that the spools are also located above said frame when said frame is in said substantially horizontal position, said means being adapted to allow rotation of said spools relative to said frame for unwinding of the wire from said spools, an axle attached to said lower end portion of said frame, said axle being below said frame when said frame is in said substantially horizontal position, a pair of laterally spaced wheels mounted on said axle for rotation relative to said frame, said wheels resting on the ground such that said upper end portion of said frame is pivotable about said axle so as to enable said frame to be pivoted between said positions, a platform extending upwardly from said frame when said frame is in said substantially horizontal position, a portable wire guide formed with a slot sized to slidably receive said platform so as to enable said guide to be located on said platform when said frame is in said substantially horizontal position, said wire guide being formed with a plurality of holes sized to slidably receive the wire, said holes being located generally above said means and extending generally horizontally when said wire guide is located on said platform such that the wire may be drawn through said holes as the wire is unwound from the spools, and means secured to said frame for storing said wire guide on said frame when said frame is in said upright position so as to enable transport of said wire guide with the spools.

6. A portable cart as defined in claim 5 in which said storing means includes a plurality of support members located rearwardly of said frame when said frame is in said upright position.

* * * * *